United States Patent [19]
Tanner

[11] Patent Number: 4,553,637
[45] Date of Patent: Nov. 19, 1985

[54] POLLUTION INHIBITOR PACKING NUT

[76] Inventor: Mark Tanner, Rte. 5, 412 Canal St., Houma, La. 70360

[21] Appl. No.: 594,788

[22] Filed: Mar. 29, 1984

[51] Int. Cl.⁴ ........................ A47L 25/00; F16N 31/02

[52] U.S. Cl. .................................. 184/15.1; 15/210 B; 175/84

[58] Field of Search .................... 184/6.27, 15.1, 15.2, 184/15.3, 16, 17; 166/77, 385; 175/84; 15/210 B

[56] References Cited

U.S. PATENT DOCUMENTS

| | | | |
|---|---|---|---|
| Re. 29,493 | 12/1977 | Crump | 184/15.1 X |
| 1,773,137 | 8/1930 | Fuller et al. | 15/210 B |
| 2,096,882 | 10/1937 | Chernosky | 15/210 B |
| 2,264,600 | 12/1941 | Webb | 15/210 B |
| 4,018,303 | 4/1977 | White et al. | 184/15.1 X |
| 4,169,427 | 10/1919 | Crump et al. | 118/307 |
| 4,498,558 | 2/1985 | Bendaham | 184/15.1 |

*Primary Examiner*—Leonard E. Smith
*Attorney, Agent, or Firm*—George A. Bode

[57] ABSTRACT

A wireline cleaning unit which replaces a conventional packing nut. A housing is sealed around a packing nut by O-rings to define an annular chamber between the housing and the exterior of the packing nut. Fluid communication between the longitudinal bore of the packing nut and the annular chamber is provided by radially extending bores through the packing nut. A line wiper disposed in the longitudinal bore of the packing nut wipes excess fluid off the line, the fluid then flowing down the longitudinal bore and through the radial drain ports into the annular chamber. The annular chamber in the outer housing is provided with a drain port and hose adapter for draining the collected fluid to a proper container.

6 Claims, 5 Drawing Figures

POLLUTION INHIBITOR PACKING NUT

BACKGROUND OF THE INVENTION

1. Field of the Invention

The present invention relates to cable cleaning units, and more particularly is related to line wipers utilized in wire line operations at oil and gas well drilling sites.

2. General Background

In connection with oil and gas well drilling various operations such as depth determinations, crooked hole tests, temperature and pressure surveys, parafin cutting, and setting, retrieving and manipulating devices in the wellbore require the use of solid wirelines. When retrieving the wireline from a well, the well fluid or lubricating fluid clinging to the line may drip or be thrown off of blocks and pulleys and creates a safety, maintenance and housekeeping problem around the wellhead site. In the past line wipers and cable cleaning units of various types have been used.

U.S. Pat. No. 4,169,427, issued to Crump, discloses a cable cleaning unit comprising two semi-cylindrical housing parts which are hinged together to form the unit. The unit has an annular nozzle chamber for surrounding a section of cable to be cleaned, with a plurality of nozzles within the chamber for directing jets of high pressure oil onto the surface of the cable at an acute angle and a spin-off chamber for receiving the oil and impurities from the cable. The spin-off chamber has a plurality of vanes for directing the oil and impurities to an outlet from the unit. A traction unit comprising a pair of pulley wheels is also provided to drive the traction unit along the cable.

U.S. Pat. No. Re 29,493, issued to Crump, discloses a cable cleaning unit having an annular chamber adapted to surround a section of cable to be cleaned, with a plurality of outlets located within the chamber. Jets of high presure fluid are directed through the outlets onto the surface of the cable. A mechanism for withdrawing the fluid from the chamber is also provided.

U.S. Pat. No. 4,336,866, issued to Blanton, discloses a rectangular shaped frame having a lubricator canister removably coupled thereto at one end. At the opposite end of the rectangular shaped frame, is an upper slide assembly which rotably supports a die. The wire cable passes through the lubricator canister which applies lubricant cleaner to the die. The die has a plurality of internal spiral grooves adapted to fit the spiral strands of the wire cable, thus cleaning the wire cable and removing the excess lubricant applied thereto.

U.S. Pat. No. 2,029,062, issued to Dippman, discloses a housing containing liquid which travels with the lubricator and recirculates the excess lubrication for reuse.

Although the above art addresses the problem of cleaning cables, it does not address the problem of removing and containing excess fluid from a wireline at the point of entry into or exit from a stuffing box and also preventing the fountain effect which takes place when the packing in a stuffing box becomes worn from the wireline operation and the wellhead pressure.

SUMMARY OF THE INVENTION

The present invention solves the problem of removal and disposal of excess well fluids or lubricating fluids from the wireline as it exits or enters the stuffing box during wireline operations.

The present invention replaces the common packing nut normally used above the stuffing box. The present invention utilizes a packing nut having an axial bore throughout for passage of the wireline and having a reduced diameter bore at substantially the mid-section thereof for the normal tightening action on the upper bushing and packing. The upper part of the axial bore is provided with a line wiper which is adapted to receive the wireline and wipe off excess fluids from the wireline as the wireline passes through the packing nut and the line wiper. Two radially extending drain ports are located at substantially the mid-section of the packing nut just above the reduced diameter bore portion and slightly below the line wiper. Both drain ports are in fluid communication with the axial bore of the packing nut and the outside of the packing nut. Fluid which is wiped from the wireline passing through the line wiper drains down the axial bore and into the drain ports. A circular and substantially hollow enclosure having an annular chamber is slidably engaged over the packing nut. The annular chamber receives the fluid from the drain ports and the packing nut and drains this collected fluid to a proper container through a drain port provided in the outer enclosure around the packing nut.

Therefore, it is an object of the present invention to provide a wireline wiper which prevents uncontrolled dispersion of fluids around the wellhead area.

It is another object of the present invention to provide a wireline wiper which collects and drains off the fluid removed from the wireline.

It is a further object of the present invention to provide a wireline wiper which may be used immediately adjacent the stuffing box during the wireline operations.

In accordancee with the above objects, it is a feature of the present invention to provide a packing nut with a wireline wiper enclosed within the packing nut.

It is another feature of the present invention to provide a wireline wiper having drain ports and a vessel for collecting and draining off the fluid removed from the wireline.

It is a further feature of the present invention to provide a wireline wiper which may be used in place of the conventional packing nut.

DETAILED DESCRIPTION OF THE INVENTION

Figure 1:
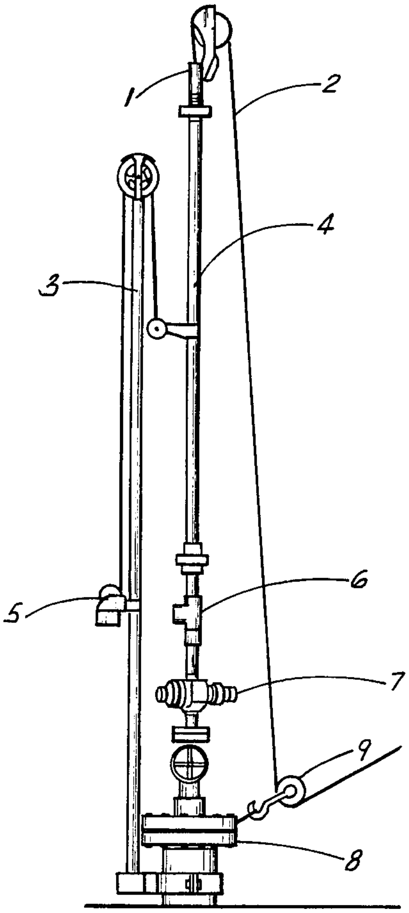
FIG. 1 is a view of a common arrangement of various components of wireline surface equipment.

FIG. 1 illustrates a typical arrangement of various components of wireline surface equipment including stuffing box 1, wireline 2, gin pole 3, lubricator 4, winch 5, tool trap 6, blow out preventor 7, wellhead 8 and pulley 9.

Figure 2:
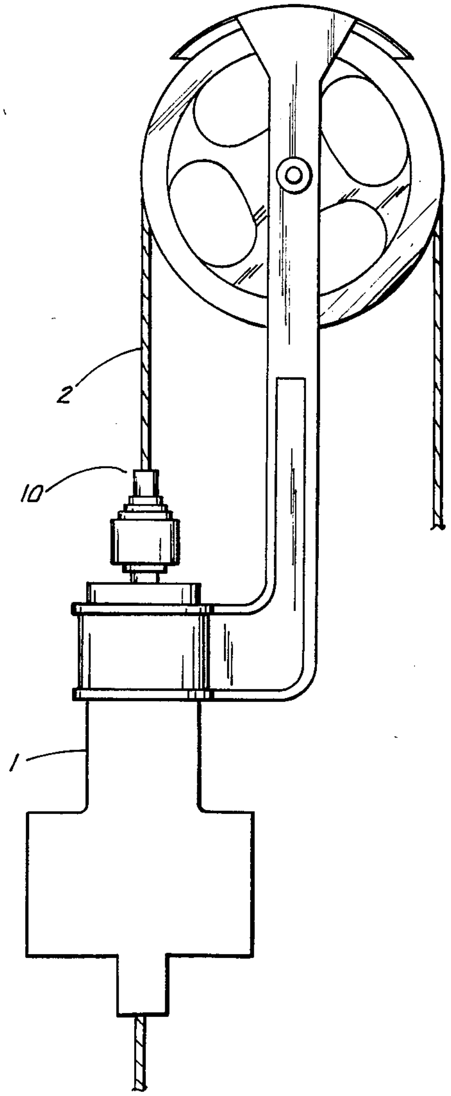
FIG. 2 is a view illustrating the present invention installed above a stuffing box.

The apparatus is generally referred to by the numeral 10 in FIGS. 2–5. FIG. 2 illustrates the apparatus 10 installed on top of stuffing box 1 in place of a packing nut which would normally be positioned on top of stuffing box 1.

Figure 3:
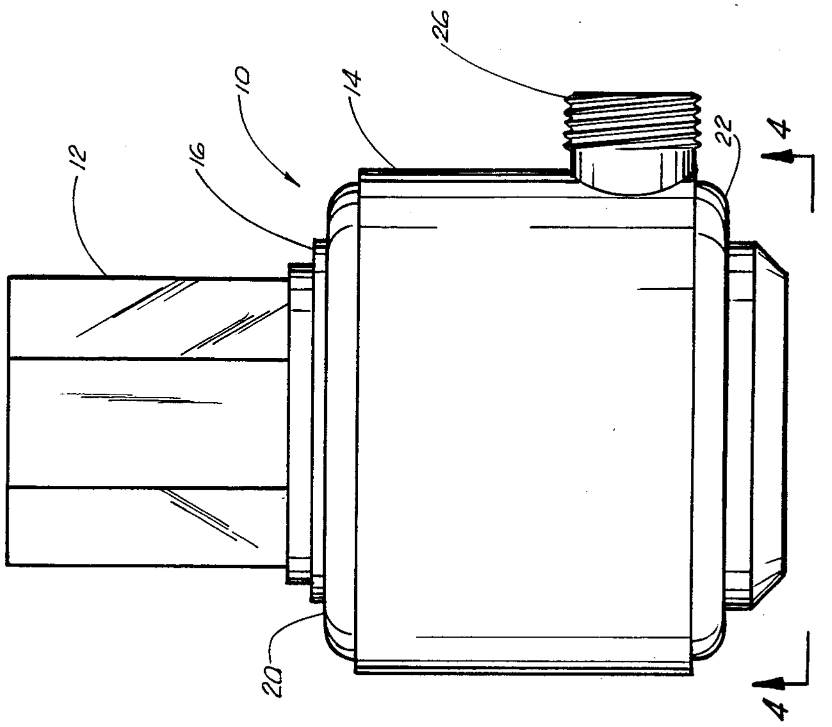
FIG. 3 is a side view of the apparatus illustrating the fluid drain port.
Figure 4:
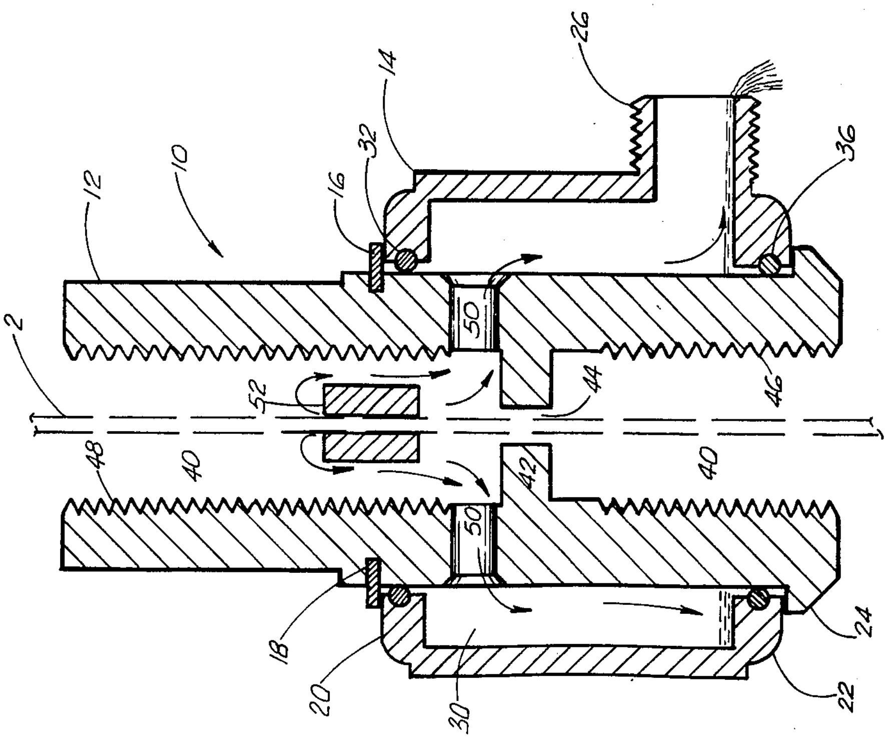
FIG. 4 is a sectional view taken along the lines 4—4 in FIG. 3.
Figure 5:
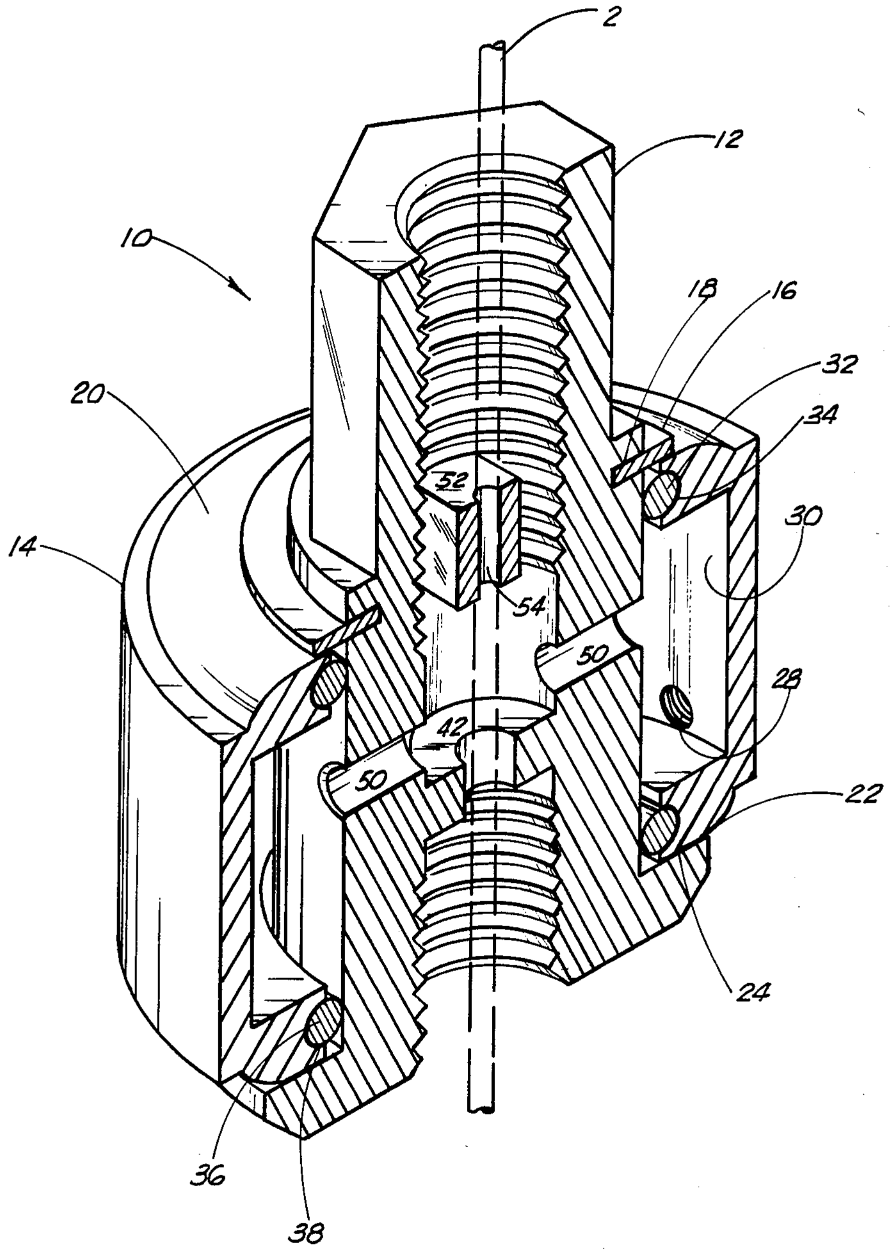
FIG. 5 is a sectional view providing an overall view of the internal structure of the present invention.

As seen in FIGS. 3–5 apparatus 10 is generally comprised of two main portions, packing nut 12 and hoousing 14, slidably engaged over packing nut 12. Packing nut 12 is shaped at its upper portion in the general shape of a packing nut or bolt to allow engagement of a wrench or appropriate tool thereto for adjustment of the packing nut 12 around a wireline 2. Housing 14 is of a generally C-shape in cross-section and is sized so as to be slidably engaged with packing nut 12. Housing 14 is maintained on packing nut 12 by resilient snap ring 16 which fits into recess 18 in packing nut 12. Snap ring 16 abuts upper shoulder 20 of housing 14 to maintain housing 14 in position. Lower shoulder 22 of housing 14 abuts shoulder 24 on the lower portion of packing nut 12 to prevent housing 14 from sliding downwardly off of packing nut 12. As seen in FIGS. 3 and 4, housing 14 is provided with a means for adapting a hose thereto to drain off any fluids collected from wireline 2 as it passes through packing nut 12. The means provided is hose adapter 26, which is threaded to receive a hose for draining any collected fluid into a proper container. Port 28, seen in FIG. 5, provides communication between the interior of housing 14 and hose adapter 26. As seen in FIGS. 4 and 5, the open interior of housing 14 forms an annular chamber 30, when housing 14 is mated with packing nut 12.

A means of sealing housing 13 with packing nut 12 is provided to prevent unwanted leakage of collected fluids from annular chamber 30. The sealing means comprises O-ring 32 at the upper portion of housing 14 which is positioned in recess 34 adapted to receive O-ring 32. Likewise, O-ring 36 is positioned in recess 38 of housing 14 for sealing the lower portion of housing 14 with packing nut 12.

Packing nut 12 is generally comprised of an elongated nut with a bore 40 extending therethrough. Shoulder 42 extends radially inward from the interior wall of packing nut 12 to form narrowed bore portion 44 substantially adjacent the center of packing nut 12. Shoulder 42 and narrowed bore portion 44 serve to mate with the upper brushing not shown on stuffing box 1. Packing nut 12 is mated with the upper bushing by threaded engagement with the upper bushing with threaded portion 46 provided on the interior wall of bore 40. The upper section of bore 40 is also provided with threaded portion 48 for attachment to any devices which may be necessary during the wireline operations.

As seen in FIGS. 4 and 5, a means for providing fluid communication between bore 40 of packing nut 12 and annular chamber 30 is provided in packing nut 12. The means for fluid communication between bore 40 and annular chamber 30 comprises radially extending lateral drain ports 50. Lateral drain ports 50 are located immediately above and adjacent shoulder 42 so that any fluids collected in the upper portion of bore 40 will drain through ports 50 into annular chamber 30.

A means for wiping the wireline running through packing nut 12 and removing any excess well fluids or lubricating fluids therefrom is provided on the inner wall of bore 40 in packing nut 12. The means for wiping the wireline comprises elongated shoulder 52 extending from the inner wall of bore 40 and having longitudinal bore 54 extending therethrough in coaxial alignment with the center of bore 40 and adapted to receive wireline 2 therethrough. Bore 54 is sized so that any excess fluid is wiped from wireline 2 due to light frictional engagement of wireline 2 with the inner walls of bore 54. As indicated by the arrows in FIG. 4, when the wireline 2 is being inserted or withdrawn from the wellhole any fluids removed from wireline 2 flow downwardly in bore 40 to shoulder 42, through drain ports 50 into annular chamber 30 and out drain port 28 and hose adapter 26.

In operation apparatus 10 is first placed on top of stuffing box 1 as a replacement for the normal packing nut. Wireline 2 is then run through packing nut 12 of apparatus 10 into stuffing box 1 and lubricator 4 where it is attached to the tools to be used in the wellhole. Packing nut 12 is then adjusted around wireline 2 to the proper tension for wiping the wireline. As the wireline is lowered into the wellhole excess lubrication fluid is removed from wireline 2 by shoulder 52 in bore 40.

The excess fluid then flow around shoulder 52 and down bore 40 into lateral drain passages 50 where it is directed into annular chamber 30. Annular chamber 30 is emptied by means of port 28 and hose adapter 26. A hose not shown is connected to hose adapter 26 for draining the collected lubrication fluid into a proper receptacle to prevent contamination and dangerous working conditions around the wellhead. Apparatus 10 may also be used for collecting excess well fluids wiped off of the wireline 2 as the wireline 2 is removed from the wellhole at the end of downhole operations.

The ability to separate apparatus 10 into its two major components provides for easy maintenance and cleaning of a wireline wiper with no moving parts.

Because many varying and different embodiments may be made within the scope of the inventive concept herein taught, and because many modifications may be made in the embodiments herein detailed in accordance with the descriptive requirment of the law, it is to be understood that the details herein are to be interpreted as illustrative and not in a limiting sense.

What is claimed as invention is:

1. A wireline cleaning unit, comprising:
   a. a packing nut having a longitudinal bore therethrough;
   b. means in said bore for removing fluid from a wireline running through said bore;
   c. means for channeling said fluid out of said longitudinal bore; and
   d. means for receiving and channeling said fluid from said longitudinal bore to a container comprising
   a housing in sealed engagement around said packing nut, the walls of said housing defining a chamber around said packing nut.

2. A wireline cleaning unit, comprising:
   a. a packing nut having a longitudinal bore therethrough;
   b. a shoulder extending across said bore having a bore therethrough in alignment with said longitudinal bore, adapted to receive said wireline and remove fluid from said wireline as said wireline runs through said bore;
   c. means for channeling said fluid out of said longitudinal bore; and
   d. means for receiving and channeling said fluid from said bore to a container further comprising a housing in sealed engagement around said packing nut, the walls of said housing defining a chamber around said packing nut.

3. A wireline cleaning unit, comprising:
   a. a packing nut having a longitudinal bore therethrough;
   b. an oblong shoulder extending across said bore having a bore therethrough in alignment with said longitudinal bore, adapted to receive said wireline and remove fluid from said wireline as said wireline runs through said bore;

c. said packing nut having at least two radially extending bores providing fluid communication between said longitudinal bore and the exterior of said packing nut; and d. A housing removably engaged with said packing nut, the walls of said housing defining a chamber around said packing nut in fluid communication with said radial bores.

4. The apparatus of claim 3, wherein said housing is retained in position around said packing nut by a snap ring.

5. The apparatus of claim 3, further comprising sealing means between said packing nut and said housing for preventing leakage from said chamber.

6. The apparatus of claim 3, further comprising said housing having a drain port adapted to receive a hose for draining collected fluid therefrom.

* * * * *